United States Patent Office 3,632,539
Patented Jan. 4, 1972

3,632,539
WELDABLE METAL PRIMERS CONTAINING GRAPHITE
Atam P. Sahni, Springfield, Mass., assignor to Monsanto Company, St. Louis, Mo.
No Drawing. Filed Jan. 2, 1968, Ser. No. 694,891
Int. Cl. C09d 5/10
U.S. Cl. 260—23
10 Claims

ABSTRACT OF THE DISCLOSURE

Disclosed herein is a weldable primer for metal surfaces. The coating is based upon a blend of graphite, a polyvinyl acetal and the esterification product of the reaction between a styrene-allyl alcohol copolymer and at least one unsaturated fatty acid containing 10–24 carbon atoms. The coating may also contain chromic acid to enhance corrosion resistance and may further contain such pigments as aluminum powder and iron oxide.

BACKGROUND OF THE INVENTION

(1) Field of the invention

This invention relates to weldable primers for application to metal surfaces. In particular, these primers may be applied to metal surfaces to protect them from corrosion and mechanical attack prior to fabrication and may be left in place during subsequent welding operations.

(2) Description of the prior art

Until very recent times, steel and other plate for use in ship and outdoor construction have usually been coated with wash primers and anti-corrosive primers to protect the metal from corrosion during the storage prior to use. These anti-corrosive primers afforded excellent protection but presented a drawback in that they had to be removed before any welding could be done for fabrication into a finished article. There was recognized a need in the industry for a shop-coat primer which would protect metal plate and which would not need to be removed before welding, priming and top-coating the metal.

In the past, preparation of the substrate, usually by shot-blasting to white metal to remove greasy, oily contaminants was necessary for adequate protection. Further, it is the practice in the steel fabricating industry to coat sheet steel which is to be cold-drawn with a waxy substance known as drawing compound. Adhesion of many coatings which have been tried has been found to be adversely affected by the presence of this drawing compound. Other primers are known in the art which will adhere to contaminated surfaces and which may be welded, however films of these formulations must be kept quite thin, i.e. of the order of 0.5 mil or less in order to permit welding. Films this thin are limited in their ability to provide corrosion resistance and protection from mechanical shock.

A weldable coating could probably be prepared by including relatively large quantities of zinc dust in some formulations, but this would be disadvantageous in that the cost of a primer is thereby greatly increased. Further, zinc compounds are believed to have adverse effects upon the gastro-intestinal system and thus present a possible health hazard to workers using them.

A need, therefore, exists for a primer which will afford a high degree of protection to corrosion and mechanical shock, which may be applied either to clean surfaces or to surfaces having greasy, oily contaminants or drawing compound deposited thereon, and which has the ability to conduct a welding arc.

SUMMARY OF THE INVENTION

It is, therefore, an object of this invention to provide a weldable primer that will adhere to metals and will remain weldable when deposited as a thick film.

It is another object of this invention to provide a primer that will adhere to metals which have not undergone any prior cleaning step to remove the products of oxidation or greasy or oily contaminants or drawing compound.

It is a further object of this invention to provide a weldable, anti-corrosive primer for metal which need not be removed prior to welding.

Another object of this invention is to provide a primer for metal which does not require removal before additional priming and top-coating of the metal.

These and other objects are attained by providing a primer vehicle based upon graphite, a polyvinyl acetal and esters formed by the reaction of a copolymer of styrene and allyl alcohol with at least one unsaturated fatty acid having 10 to 24 carbon atoms.

More particularly, this invention relates to a primer which comprises:

(A) a polymeric blend comprising (1) about 5 to 95 percent by weight of a polyvinyl acetal, and, correspondingly,
(2) about 95 to about 5 percent by weight of a fatty acid ester of a copolymer of an ethylenically unsaturated alcohol and a styrene monomer or adducts of said ester with $\alpha$, $\beta$ ethylenically unsaturated carboxylic compounds; said esterified copolymer being a copolymer of:
  (a) an ethylenically unsaturated alcohol selected from the group consisting of allyl alcohol, methallyl alcohol and mixtures thereof, and
  (b) a styrene monomer selected from the group consisting of styrene, $\alpha$ and $\beta$ substituted styrene, ring-substituted mono- and di-, alkyl-, chloro- and chloroalkyl styrene and mixtures thereof, wherein said copolymer, before esterification has a hydroxyl group content of from about 4–7.5 percent by weight; from 50–75 percent of said hydroxyl groups being esterified with fatty acids selected from the group consisting of unsaturated fatty acids containing from 10–24 carbon atoms, mixtures of unsaturated fatty acids containing from 10–24 carbon atoms with saturated fatty acids and mixtures thereof as obtained from the hydrolysis of drying and semi-drying oils.

About 2.5 percent to about 25 percent by weight of adipic acid, based on the weight of the resin solids may further be added to enhance adhesion to metal surfaces coated with drawing compound.

To this vehicle may also be added, if desired, about 0.5 percent to about 3 percent by weight chromium trioxide, based on the amount of the polyvinyl acetal. It has been found that in the presence of water, chromium trioxide forms chromic acid which improves the corrosion resistance of the coating.

Pigments based upon metals and metal compounds may also be added to improve the physical characteristics and aesthetic appearance of the primer. In particular, aluminum powder has been found useful in that it provides additional resistance to corrosion and further provides a structural network which gives support to the graphite. Ferric oxide has also been found useful in that it lends hardness to the primer film.

DESCRIPTION OF THE PREFERRED EMBODIMENTS

The term "polyvinyl acetal" as used herein is intended to mean the product, in the presence of an acid catalyst, of the reaction between polyvinyl alcohol and an aldehyde and is not intended to be limited to the reaction product of polyvinyl alcohol and acetaldehyde. A few of the various alcohols which may be used to produce the polyvinyl acetals of this invention are, for example, formaldehyde, acetaldehyde, propionaldehyde, butyraldehyde, caproaldehyde, nicotinaldehyde, cinchoninaldehyde, crotonaldehyde, cinnamaldehyde, p-tolualdehyde, benzaldehyde, 1-naphthaldehyde, 2-anthraldehyde, 2-furaldehyde, etc. For the optimum in physical properties of the finished resin system, the preferred resin is polyvinyl butyral.

The polyvinyl butyral resin employed in the practice of this invention may have a vinyl alcohol content of from 5 to 30 weight percent and a residual acetate content of less than 10 weight percent, based on the total resin weight. Especially preferred are polyvinyl butyrals with a vinyl alcohol content of from 14 to 22 percent and a residual acetate content of from 1.0 to 5.0 percent. The weight average molecular weight of the polyvinyl butyral may vary from 25,000 to 250,000 with a preferred range of 25,000 to 50,000.

The esterified copolymers of this invention are copolymers of from 60–85 percent by weight of styrene and, correspondingly, from 40 to 15 percent by weight of an ethylenically unsaturated alcohol wherein from 50 to 75 percent of the hydroxyl groups thereof are esterified with an unsaturated fatty acid. The actual hydroxyl group content of the aforesaid polymers (before esterification) will not always conform to the theoretical content calculated from the relative proportions of styrene monomer and ethylenically unsaturated alcohol, due to possible destruction of hydroxyl groups during copolymerization. In general, however, copolymers containing from about 4.0 to 7.5 percent hydroxyl groups by weight are within the scope of this invention. The styrene monomer moiety of said copolymer may be styrene, $\alpha$ or $\beta$ substituted styrene or a ring-substituted styerene in which the substituents are 1–4 carbon atom alkyl groups or chlorine groups. Examples of such substituted styrenes include the ortho-, meta- and para-, methyl, ethyl, butyl, etc., mono-alkyl styrenes; 2,2- 2,4-dimethyl and diethyl styrene, mono- di- and tri-chlorostyrenes; alkyl chlorostyrenes, such as 2-methyl-4-chlorostyrene, $\alpha$-methylstyrene etc. Mixtures of two or more such styrene monomer moieties may be present. The ethylenically unsaturated alcohol moiety may be allyl alcohol, methallyl alcohol, or a mixture thereof.

For the purposes of brevity and simplicity of discussion, the entire class of copolymers set forth in this paragraph shall hereinafter be referred to as styrene-allyl alcohol copolymers.

The styrene-allyl alcohol copolymers may be prepared in several ways. (See, for example, U.S. 2,940,946.) It is most desirable to copolymerize the styrene and allyl alcohol components in a substantially oxygen-free system, thus minimizing the oxidative loss of hydroxyl groups. (See, U.S. 2,894,938.)

The unsaturated fatty acids with which the aforementioned styrene-allyl alcohol copolymers are esterified are those containing from 10–24 carbon atoms. Examples of suitably unsaturated fatty acids include $\Delta^{9,10}$ decylenic acid, $\Delta^{9,10}$ dodecylenic acid, palmitoleic acid, oleic acid, moricinoleic acid, petroselinic acid, vaccenic acid, linoleic acid, linolenic acid, eleostearic acid, licanic acid, parinaric acid, tariric acid, gadoleic acid, arachidoinc acid, cetoleic acid, erucic acid, etc. Mixtures of such fatty acids may also be employed. Especially preferred are the mixtures of such unsaturated fatty acids as are obtained by the hydrolysis of drying and semi-drying oils such as acorn oil, beech nut oil, brazil nut oil, chaulmoogra oil, corn oil, cotton seed oil, croton oil, hemp seed oil, linseed oil, oiticica oil, perilla oil, poppy seed oil, sesame oil, soy bean oil, safflower oil, sunflower oil, tall oil, tung oil, walnut oil, dehydrated caster oil, etc.

Saturated acids and mixtures thereof may also be used in admixture with the above described unsaturated fatty acids to form esters with the allyl alcohol moiety. Examples of such saturated acids are, e.g., formic, acetic, propionic, butyric, valeric, caproic, enanthic, caprylic, pelargonic, capric, hendecanoic, lauric, tridecanoic, myristic, pentadecanoic, palmitic, margaric, stearic nonadecanoic, arachidic, heneicosanic, behenic, tricosanoic, tetracosanoic, pentacosanoic, cerotic, heptacosanoic, octacosanoic, nonacosanoic, tricontanoic, melissic, lacceric and their structural isomers.

The esterified resins are prepared by coreacting the fatty acid and a styrene-allyl alcohol copolymer until some 50–75 percent of the hydroxyl groups of the copolymer are esterified. This may be accomplished by employing a proportion of the fatty acids substantially stoichiometrically equivalent to the proportion of hydroxyl groups desired to be esterified. The necessary proportions may be readily determined by a chemist from quantitative analysis data expressed in milliequivalents of carboxyl and hydroxyl groups per unit weight of fatty acid and styrene-allyl alcohol copolymer, respectively.

The esterification reaction, in detail, may be effected to the desired degree of esterification at temperatures of from 160° C. to about 225° C. without significant destruction of hydroxyl groups. However, prolonged heating at higher temperatures is apt to result in a loss of hydroxyl groups from the copolymer. Thus, it is preferred to avoid the use of reaction temperatures above about 225° C. although temperatures of up to about 325° C. may be employed if desired. The reaction may be terminated short of completion merely by ceasing to heat, by quenching, or by other conventional techniques. The esterification may be conducted in the presence of any inert hydrocarbon such as, e.g., xylene, mineral spirits, etc. However, the use of solvent is optional since the esterification proceeds satisfactorily in the absence of solvent.

The polyvinyl acetal and the esterified styrene-allyl alcohol copolymer may be advantageously blended in weight ratios of from 95/5 to 5/95, inclusive. For better adhesion, workability, impact resistance and resistance to salt water and salt spray, it is preferred that the esterified styrene-allyl alcohol portion account for 30–80 percent of the weight of the total resin. For the optimum in these physical characteristics, the most preferred range for the esterified styrene-allyl alcohol portion is 50–75 percent.

Adducts of $\alpha,\beta$ ethylenically unsaturated carboxylic compounds across the double bond of the unsaturated acid which forms the ester are also contemplated as being within the scope of this invention. Any ethylenically unsaturated carboxylic acid, anhydride or a partial ester thereof, containing the structure

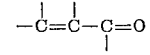

may be employed in forming the adducts. Anhydrides are preferably employed. However, to avoid redundancy the term "acid" as hereinafter employed in naming specific examples of useful compounds and in otherwise referring to these compounds shall be understood to include and refer to the corresponding anhydride where possible as well as to the partial esters. Thus, one may employ monocarboxylic acids such as, for example, acrylic acid, methacrylic acid, crotonic acid, isocrotonic acid, vinyl acetic acid, ethacrylic acid, dimethyl acrylic acid, terarylic acid, angelic acid, Tiglic acid, etc. and polycarboxylic acids such as, for example, itaconic acid, citraconic acid, chloromaleic acid, mesaconic acid, aconitic acid, maleic aid, fumaric acid, etc.

In the case of polycarboxylic acids, the partial, e.g., not exceeding one-half, esters thereof with 1–10 carbon atom alcohols may be employed. Examples thereof include mono-methyl maleate, mono-butyl fumarate, mono-butyl maleate, mono-decyl maleate, mono-benzyl maleate, etc.

In preparing the adducts, up to a stoichiometric proportion of the ethylenically unsaturated carboxylic acid with respect to the esterified styrene-allyl alcohol copolymer is employed, equating the unsaturation in the esterified copolymer as measured by the total iodine number thereof, using in this instance ASTM D1541–58T, with the unsaturation in the ethylenically unsaturated carboxylic acid.

In preparing the adducts, the esterified styrene-allyl alcohol copolymer and the ethylenically unsaturated carboxyic acid are combined in a suitable reaction vessel, preferably equipped with a reflux condenser and means for charging materials during reaction. Adduction is effected at temperatures of from about 50° C. to reflux, and more preferably at from about 100° C. to reflux, until substantially all of the ethylenically unsaturated carboxylic compound has been consumed. The presence of an organic solvent during adduction does not interfere except insofar as the particular solvent employed may not, at the reaction pressure employed, permit the reaction temperature to approach reaction conditions or maintain the reactive materials in a physical state permitting effective co-reaction.

Although not necessary to the practice of this invention, it has been found advantageous to effect the adduction in the presence of a small proportion of iodine; for example, up to about 2 weight percent, based upon the total weight of esterified styrene-allyl alcohol copolymer and ethylenically unsaturated carboxylic acid. The function of the iodine during adduction is to lighten the color of the resulting product and also to depress the molecular weight of the product so as to retain a lower viscosity and avoid gelation. This function is unusual in this art since the normal use of iodine is to catalyze reaction with conjugated unsaturation.

In the systems of this invention, however, there may be very little, if any, conjugation. Thus, while no iodine need be employed, it has been found that the adducted product contains a level of color which may be found to be objectionable in certain instances. More importantly, however, when iodine is not used, the adduction reaction should be more carefully controlled so as to avoid gelation. The use of too much iodine, on the other hand, has been found to decrease the chemical, or hydrolysis, resistance of films prepared from the adducted product. Generally, the iodine is predispersed in a solvent and charged to the reaction system along with the ethylenically unsaturated carboxylic acid, but may be added during the adduction reaction, if desired, but at some sacrifice in efficacy.

The adduction reaction may be effected in the optional presence of an organic solvent. Generally, up to 10 percent by weight, based upon total solids, of a non-reactive organic solvent will provide a suitable reaction mixture. However, significantly more solvent may be employed, if desired, provided the solvent is preselected so as to be either water-miscible or capable, in the proportion used, of forming aqueous solutions when the water and a water-miscible organic cosolvent are charged. Varsol, xylol, toluene, isobutyl ketone, etc. have been found to be excellent media in which the adduction may be effected.

Returning now to the composition of the primer itself, chromium trioxide may be added where good water resistance and improved corrosion protection is required.

The organic solvent employed in the practice of this invention should not be corrosive to the metal plate or react adversely with any of the other ingredients in the primer. In general, mixtures of non-polar aromatic hydrocarbons with miscible aliphatic polar solvents have been found particularly useful. The particular components chosen and their proportions will, of course, be dependent upon the precise types and proportions of the polymers to be dissolved. Examples of suitable solvents include: 1/1 xylene/ethanol; 47.5/47.5/5.0 toluene/butanol/cyclohexanone; 51/34/15 toluene/butanol/ethylene glycol monomethylether; 1/1 isopropanol/toluene. Especially preferred is a solvent blend of 1/1 toluene/butanol.

Where aluminum powders are employed in the practice of this invention, they should be of a mesh size consonant with the objectives of resisting corrosion and supporting the graphite. In practice, it has been found desirable to use aluminum powders of 100 mesh or finer. Leafing or non-leafing grades of aluminum powder may be used as well as mixtures of the two.

Where the primer of this invention is to be applied to metal surfaces having drawing compound deposited thereon, it is preferred that the formulation contain adipic acid. Of course, it will be understood that the primers of this invention which contain adipic acid also adhere well to clean surfaces; that is to say, having drawing compound on the substrate surface is not essential to good adhesion, but rather, these primers will adhere in spite of the presence of the drawing compound. It is contemplated that the adipic acid will be used in concentrations of from about 2.5 percent by weight to about 25 percent based upon the resin. Below 2.5 percent, adhesion has been found to be inadequate; above 25 percent, the acid exerts an adverse effect on the corrosion resistance of the primer. For better adhesion and corrosion resistance, a concentration range for the adipic acid of from 3–10 percent by weight based upon the resin is preferred. A concentration of about 5 percent by weight has been found to give the optimum results and is most preferred.

For the purposes of this invention, any graphite may be used, i.e. natural or synthetic, amorphous or crystalline. It has been found, however, that high purity graphites generally produce better results than those containing a large percentage of coal carbon or other impurities. This invention is operable with any quantity of graphite, the only upper limitation being the binding capacity of the resinous base. For better film properties, such as hardness and corrosion resistance, however, from about 5 parts to about 200 parts by weight of graphite per 100 parts by weight of resin solids is preferred. It has been found that the optimum film properties are obtained when the graphite content is in the range of from 10–100 parts by weight per 100 parts by weight of resin solids. As used herein, the term "graphite" is intended to include all forms of carbon having a planar, hexagonal crystal structure, either on the microscopic or macroscopic scale, that is to say, carbon in all its forms other than those with the tetrahedral, "diamond" structure.

The following examples are presented in illustration of the invention and are not intended as limitations thereof. Where parts are mentioned, parts by weight are intended unless otherwise described.

EXAMPLE I

Part A

A one liter flask is equipped with a stirrer, a thermometer, a water condenser, and a trap filled with xylene. 300 grams of a copolymer comprised of about 70 percent by weight of styrene and, correspondingly, a theoretical 30 percent by weight of allyl alcohol, and having an actual hydroxyl group content of about 6.4 percent by weight, are charged thereto together with 240 grams of soya fatty acids and 30 grams of xylene. The mixture is gradually heated to reflux (to about 160° C.) and then to about 225° C. over a period of one hour and is maintained thereat for an additional hour. About 30 milliliters of mixed water and xylene are removed from the trap. The batch temperature is then increased over a 35 minute period to about 300° C. and is maintained thereat for an additional 2 hours. A fused esterified resin wherein approximately 75 percent of the hydroxyl groups have been esterified, is obtained in conjunction with sufficient fatty acid to provide an acid number of about 3.

Part B 100 parts of the final product (96 percent resin in xylene) of part A is added to a mixing kettle containing 400 parts of n-butanol and 400 parts of toluene. This addition is carried out under agitation of moderate intensity, and the agitation is continued throughout the process. 100 parts of polyvinyl butyral is further added to the agitation vortex. After a short time, both resins dissolve in the solvent mixture.

Part C

To 100 parts of the solution prepared in Example I, part B, is added one part of adipic acid.

EXAMPLE II

To 105 parts of the solution of Example I, part C is added 40 parts of graphite, 0.2 part 6 percent cobalt drier, 0.5 part water, 0.2 part chromium trioxide, 4.5 parts methyl ethyl ketone, and 4 parts of leafing aluminum powder of 325 mesh. A film of the material is applied to a 4 x 8 steel test panel yielding a dry film having a thickness of 2.4 mils. The test sample has a good appearance, is resistant to salt fog attack, exhibits good weldability and adhesion.

EXAMPLE III

Control

To 100 parts of the solution of Example I, part C, is added 0.2 part of a 6 percent cobalt drier. The solution is then sprayed onto a 4 x 8 steel test panel and the film thus deposited is permitted to dry. It is found that when two such panels are placed in contact with each other, either with the two coated sides in contact (face to face) or with the two uncoated sides in contact (back to back) and subjected to the action of a spot welding machine, no current is conducted and no spot welding occurs.

EXAMPLE IV

Control

To 100 parts of the solution prepared in Example I, part C, is added 0.5 part water, 0.2 part chromium trioxide, 4.5 parts methyl ethyl ketone, and 0.2 part 6 percent cobalt drier. Four test panels are coated with the solution thus prepared. Panels 1 and 2 are baked for 30 minutes at 250° F., yielding films having a thickness of 0.7 mil and 0.6 mil, respectively. Panels 3 and 4 are permitted to air dry, yielding films having thicknesses of 0.65 mil and 0.8 mil, respectively. Panels 1 and 2 are placed face to face, as are panels 3 and 4. It is then attempted to spot weld the panels together under the following operating conditions: ¼" electrode, 10,000+ amps, 500 p.s.i. pressure, 5.38 volts. In neither case was a weld achieved.

EXAMPLE V

Control

To 105 parts of the solution of Example I, part C is added 6 parts of zinc dust, 0.2 part 6 percent cobalt drier, 0.5 part water, 0.2 part chromium trioxide, 4.5 parts methyl ethyl ketone, and 4 parts of leafing aluminum powder of 325 mesh. A film of the material is applied to a steel test panel yielding a dry film having a thickness of 0.5 mil. It was found that the panels thus prepared could not be welded under the conditions described in Example III.

Examples III–V above are given as controls and are to be compared with Example II which is representative of the compositions and process of the present invention. It is seen that a good spot weld can be achieved in the presence of graphite while such a weld is not achieved in its absence, even when zinc dust is present to conduct the electric current.

EXAMPLE VI

Example II is repeated using 10 parts of the graphite. Results equivalent to those of Example II are achieved.

EXAMPLE VII

To 100 parts of the solution prepared in Example I, part B, are added 0.5 part water, 0.2 part chromium trioxide, 4.5 parts methyl ethyl ketone, 0.2 part 6 percent cobalt naphthenate, 3.0 parts of leafing aluminum powder having a mesh of 325, 12.0 parts of non-leafing aluminum powder having a mesh of approximately 325 and 10 parts of graphite. The above formulation is then diluted for spraying purposes with 10 parts of 50/50 toluene/butanol. It is found that a good weld can be achieved with this formulation with a film thickness of 1.2 mils. A separate test panel having a dry film of 1.6 mils, of the same formulation, is subjected to ten days in a condensing humidity cabinet. At the end of this period, it is found that adhesion of the film to the substrate is excellent, that there was no blistering or undercutting, and only a very few spots of corrosion.

EXAMPLE VIII

Example VII is repeated using only 4 parts of the non-leafing aluminum powder and 5 parts of the graphite. Results equivalent to those of Example VII are achieved.

EXAMPLE IX

To 100 parts of the solution of Example I, part B, are added 1.0 part water, 0.2 part chromium trioxide, 4.0 parts methyl ethyl ketone, 0.2 part 6 percent cobalt octoate, 8 parts of non-leafing aluminum powder, 4 parts of leafing aluminum powder and 1 part of graphite. The formulation thus prepared is applied to steel test panels using a doctor blade having a 9 mil opening. It is found that a weld can be obtained by spot welding while the film is still wet. A separate panel is dried at 250° F. for 30 minutes and is then placed in a salt fog cabinet for 10 days. After the salt fog exposure, adhesion of the primer film to the substrate is found to be fair, there is about 10 percent blistering, and only slight undercutting. The panel is examined visually for corrosion and given a value of 6. This is based upon a scale wherein 10 represents no corrosion and 1 represents severe and total corrosion. The thickness of the dry film is 1.5 mils.

EXAMPLE X

Example IX is repeated except that no graphite is added. In this case it is not possible to obtain a weld.

EXAMPLE XI

To 100 parts of the resin solution of Example I, part B are added 1 part water, 0.2 part chromium trioxide, 4 parts methyl ethyl ketone, 8 parts graphite, 8 parts of non-leafing aluminum powder, and 10 parts of ferric oxide. The components are well mixed with a high intensity agitator and then placed in a ball mill and ground for 24 hours. At the end of the grinding time, 0.2 part of cobalt octoate drier is added to the sample. The drier is mixed in and the formulation is filtered through two layers of cheese cloth. Films 6 mils thick when wet are applied to the steel panels with a doctor blade and air dried for 4 hours. When dry, it is found that the films exhibit excellent weldability and yield only a moderate amount of weld flashing. Samples are placed in a salt fog cabinet for 10 days, at the end of which time there is no blistering, no under-cutting, excellent adhesion and a corrosion value of 8, based upon the scale described above. Another sample is placed in a 100 percent condensing humidity cabinet for 10 days. At the end of this time there is no blistering, excellent adhesion, and a 10 value for corrosion.

EXAMPLE XII

Example I, part B is repeated using 160 parts of the product of Example I, part A and 40 parts of polyvinyl butyral.

EXAMPLE XIII

Example I, part B is repeated using 160 parts of polyvinyl butyral and 40 parts of the product of Example I, part A.

EXAMPLE XIV

Example XI is repeated substituting the product of Example XII for the product of Example I, part B used therein. Results equivalent to those in Example XII are achieved.

EXAMPLE XV

Example XI is repeated substituting the product of Example XIII for the product of Example I, part B used therein. Results equivalent to those of Example XI are again achieved.

It is obvious, of course, that various additives, such as dyes, fillers, extenders, wetting agents, pigments other than those disclosed in the examples and the like, may be added to the composition without departing from the scope of the invention. In particular, the use of titanium dioxide as a pigment in these formulations may be found to be beneficial in some applications.

Although the examples have mentioned the application of these primers only to steel substrates, it should be pointed out that the invention is not limited in this regard. In particular, these formulations will be found to adhere readily to galvanized steel and to such other metal surfaces as brass, copper, zinc, iron, stainless steel, bronze, aluminum, nickel, etc.

Application of the coatings may be accomplished by any conventional method such as, e.g., brushing or dipping and are not, of course, limited to spraying or casting.

It is obvious that many other variations may be made in the products and methods set forth above without departing from the spirit and scope of this invention.

What is claimed is:

1. A weldable primer for the protection of metal substrates comprising:
    (A) a polymeric blend comprising:
        (1) about 5 to about 95 percent by weight polyvinyl acetal and, correspondingly,
        (2) about 95 to about 5 percent by weight of a fatty acid ester selected from the group consisting of esters of a copolymer of an ethylenically unsaturated alcohol and a styrene monomer and adducts of said ester with $\alpha, \beta$ ethylenically unsaturated carboxylic compounds: said esterified copolymer being a copolymer of:
            (a) an ethylenically unsaturated alcohol selected from the group consisting of allyl alcohol, methallyl alcohol and mixtures thereof, and
            (b) styrene monomer selected from the group consisting of styrene, $\alpha$ and $\beta$-substituted styrene, ring-substituted mono- and di-, alkyl-, chloro- and chloroalkyl styrene and mixtures thereof, wherein said copolymer, before esterification has a hydroxyl group content of from about 4–7.5 percent by weight; from 50–75 percent of said hydroxyl groups being esterified with fatty acids selected from the group consisting of unsaturated fatty acids containing from 10–24 carbon atoms, mixtures of unsaturated fatty acids containing from 10–24 carbon atoms with saturated fatty acids and mixtures thereof as obtained from the hydrolysis of drying and semi-drying oils; and
    (B) graphite.

2. The weldable primer of claim 1 further containing chromium trioxide.

3. The weldable primer of claim 1 further containing aluminum powder.

4. The weldable primer of claim 1 further containing ferric oxide.

5. The weldable primer of claim 1 incorporated into a solvent system non-corrosive with respect to the metal substrate to be coated.

6. The weldable primer of claim 5 wherein the solvent system is 1:1 toluene: n-butanol.

7. A metal substrate having coated thereon a weldable primer comprising:
    (A) a polymeric blend comprising:
        (1) about 5 to about 95 percent by weight polyvinyl butyral and, correspondingly,
        (2) about 95 to about 5 percent by weight of a fatty acid ester selected from the group consisting of esters of a copolymer of an ethylenically unsaturated alcohol and a styrene monomer, and adducts of said ester with $\alpha, \beta$-ethylenically unsaturated carboxylic compounds; sadi esterified copolymer being a copolymer of:
            (a) an ethylenically unsaturated alcohol selected from the group consisting of allyl alcohol, methallyl alcohol and mixtures thereof, and
            (b) a styrene monomer selected from the group consisting of styrene, $\alpha$ and $\beta$-substituted styrene, ring-chloroalkyl styrene and mixtures thereof, wherein said copolymer, before esterification has a hydroxyl group content of from about 4–7.5 percent by weight from 50–75 percent of said hydroxyl groups being esterified with fatty acids selected from the group consisting of unsaturated fatty acids containing from 10–24 carbon atoms, mixtures of unsaturated fatty acids containing from 10–24 carbon atoms with saturated fatty acids and mixtures thereof as obtained from the hydrolysis of drying and semi-drying oils; and
    (B) graphite.

8. A process for protecting metal substrates from corrosion and mechanical shock which comprises applying to the substrate a weldable primer comprising:
    (A) a polymeric blend comprising:
        (1) about 5 to about 95 percent by weight polyvinyl butyral and, correspondingly,
        (2) about 95 to about 5 percent by weight of a fatty acid ester selected from the group consisting of esters of a copolymer of an ethylenically unsaturated alcohol and a styrene monomer, and adducts of said ester with $\alpha, \beta$ ethylenically unsaturated carboxylic compounds; said esterified copolymer being a copolymer of:
            (a) an ethylenically unsaturated alcohol selected from the group consisting of allyl alcohol, methallyl alcohol and mixtures thereof, and
            (b) a styrene monomer selected from the group consisting of styrene, $\alpha$ and $\beta$-substituted styrene, ring-substituted mono- and di-, alkyl-, chloro-, and chloroalkyl styrene and mixtures thereof, wherein said copolymer, before esterification has a hydroxyl group content of about 4–7.5 percent by weight; from 50–75 percent of said hydroxyl groups being esterified with fatty acids selected from the group consisting of unsaturated fatty acids containing from 10–24 carbon atoms, and mixtures of unsaturated fatty acids containing from 10–24 carbon atoms with saturated fatty acids and mixtures thereof as obtained from the hydrolysis of drying and semi-drying oils; and
    (B) graphite.

9. An article of manufacture fabricated by welding together at least two metals, at least one of which is coated with a weldable primer comprising:
    (A) a polymeric blend comprising:
        (1) about 5 to about 95 percent by weight polyvinyl acetal and, correspondingly,
        (2) about 95 to about 5 percent by weight of a fatty acid ester selected from the group consisting of ester of a copolymer of an ethylenically unsaturated alcohol and a styrene monomer, and adducts of said ester with $\alpha, \beta$ ethylenically unsaturated carboxylic compounds; said esterified copolymer being a copolymer of:
            (a) an ethylenically unsaturated alcohol selected from the group consisting of allyl alcohol, methallyl alcohol and mixtures thereof, and (b) a styrene monomer selected from the group consisting of styrene, $\alpha$ and $\beta$-substituted styrene, ring-substituted mono- and di-, alkyl-, chloro- and chloroalkyl styrene and mixtures thereof, wherein said copolymer, before esterification has a hydroxyl group content of from about 4–7.5 percent by weight; from 50–75 percent of said hydroxyl groups being esterified with fatty acids selected from the group consisting of unsaturated fatty acids containing from 10–24 carbon atoms, mixtures of unsaturated fatty acids containing from 10–24 carbon atoms with saturated fatty acids and mixtures thereof as obtained from the hydrolysis of drying and semi-drying oils; and (B) graphite.

10. The article of claim 9 wherein the welding method used in the fabrication of the article is spot welding.

References Cited

Kirk-Othmer: Encyclopedia of Chemical Technology, page 332 of vol. 4 (2nd edition); 1964.

DONALD E. CZAJA, Primary Examiner

D. J. BARRACK, Assistant Examiner

U.S. Cl. X.R.

106—14; 117—132, 161, 167, 226, 232; 260—32.8, 33.2, 33.4, 33.6, 41, 874

PO-1050
(5/69)

UNITED STATES PATENT OFFICE
CERTIFICATE OF CORRECTION

Patent No. 3,632,539      Dated January 4, 1972

Inventor(s) Atam P. Sahni

It is certified that error appears in the above-identified patent and that said Letters Patent are hereby corrected as shown below:

Column 3, line 40, "2,2" should read - - - 2,3 - - -.

Column 10, line 11, "sadi" should read - - - said - - -.

Column 10, line 18, after "ring-", insert - - - sub-
     stittuted mono- and di-, alkyl-, chloro- and - - -.

Signed and sealed this 20th day of June 1972.

(SEAL)
Attest:

EDWARD M. FLETCHER, JR.      ROBERT GOTTSCHALK
Attesting Officer      Commissioner of Patents